UNITED STATES PATENT OFFICE.

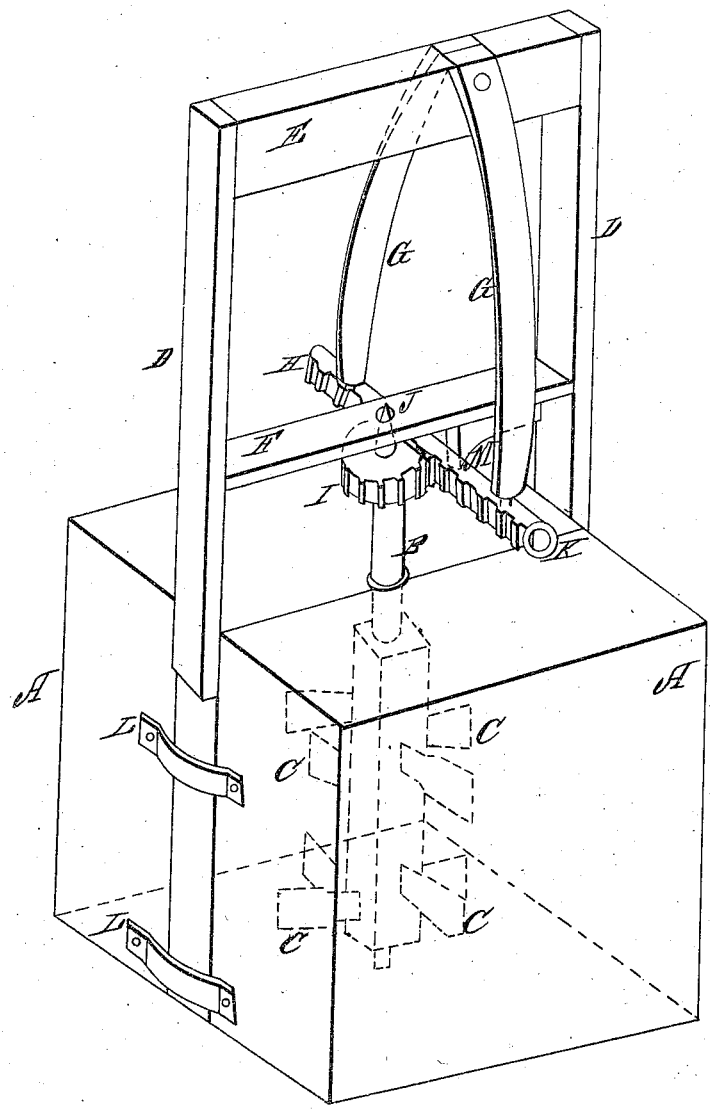

AMOS G. BINNS, OF GOSHEN, OHIO.

IMPROVEMENT IN CHURNS.

Specification forming part of Letters Patent No. 36,269, dated August 26, 1862.

*To all whom it may concern:*

Be it known that I, AMOS G. BINNS, of Goshen township, Mahoning county, State of Ohio, have invented new and useful Improvements in Churns; and I do hereby declare that the following is a full and exact description thereof, reference being had to the accompanying drawing, and to the letters of reference marked thereon, making a part of this specification.

The nature of my invention consists in the arrangement of curved springs with a rack and toothed wheel to operate the churn.

To enable others skilled in the art to make and use my invention, I will proceed to describe its construction and operation, as follows, to wit:

A represents the box, which is square and into which the cream is poured.

B represents a view of the vertical shaft, having beaters C projecting from its sides. This shaft and beaters I do not desire to confine my invention to, as they are ordinary beaters, old devices common to churns, and I may change the shape of the beaters if I think proper.

D represents the upright frame, with cross pieces or braces E and F. From the top cross-piece E, I have two wooden springs, G, extending downward in a curve, one on each side of frame D, and at the lower ends of these springs G, I have a rack, H, attached, which, when the churn is not in use, I detach, so that the springs G may spread outward and be relieved of their strain. The rack H is held to the springs G by the point of the springs passing through the rack, and a small wooden pin is thrust through the rack and tenon.

The shaft B works and vibrates in the aperture J of the cross-piece F. Below the cross-piece F is a horizontal toothed wheel, I, on the shaft B, which gears into the rack H. There is a handle, K, at one end of the rack for the purpose of moving the rack back and forward. The operator thus moves the rack back and forward with his hand, and the rack operates the wheel I and gives motion to the shaft B, which vibrate the beaters C and stir the cream.

The upright frame D extends down on each side, and is held to the sides of box A by clips L, but not permanently, so that the frame may be raised at any time to remove the shaft and beaters when necessary to do so.

A small block, M, is attached to the under side of lower cross-piece, F, to serve as a guide to the straight movement of the rack H.

What I claim as my invention, and desire to secure by Letters Patent, is—

The arrangement and combination of the springs G, rack K, and wheel I, arranged and combined as herein described, and for the purposes set forth.

A. G. BINNS.

Witnesses:
J. FRANKLIN REIGART,
JOHN S. HOLLINGSHEAD.